(12) United States Patent
Brinig et al.

(10) Patent No.: US 12,250,264 B2
(45) Date of Patent: *Mar. 11, 2025

(54) MULTI-INVITATION MODE FOR TRANSPORT SERVICES

(71) Applicant: Uber Technologies, Inc., San Francisco, CA (US)

(72) Inventors: Kevin Brinig, San Francisco, CA (US); Kartik Murthy, San Francisco, CA (US)

(73) Assignee: Uber Technologies, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/140,379

(22) Filed: Apr. 27, 2023

(65) Prior Publication Data
US 2023/0300188 A1 Sep. 21, 2023

Related U.S. Application Data

(63) Continuation of application No. 17/568,415, filed on Jan. 4, 2022, now Pat. No. 11,665,226, which is a continuation of application No. 16/749,562, filed on Jan. 22, 2020, now Pat. No. 11,252,225, which is a continuation of application No. 16/193,652, filed on Nov. 16, 2018, now Pat. No. 10,587,679, which is a continuation of application No. 15/368,368, filed on Dec. 2, 2016, now Pat. No. 10,171,569.

(51) Int. Cl.
G06Q 50/40 (2024.01)
H04L 67/1004 (2022.01)
H04L 67/51 (2022.01)
H04L 67/54 (2022.01)

(52) U.S. Cl.
CPC ......... *H04L 67/1004* (2013.01); *G06Q 50/40* (2024.01); *H04L 67/51* (2022.05); *H04L 67/54* (2022.05)

(58) Field of Classification Search
None
See application file for complete search history.

(56) References Cited

U.S. PATENT DOCUMENTS 7,751,315 B1 7/2010 Pai
10,248,913 B1 4/2019 Gururajan
(Continued)

*Primary Examiner* — Joshua Joo
(74) *Attorney, Agent, or Firm* — Mahamedi IP Law LLP

(57) ABSTRACT

A computing system can receive service requests from computing devices of requesting users, with each respective service request including a start location and a destination location. For a respective service request, the system can transmit a transport invitation to a plurality of provider computing devices in accordance with a multi-invitation mode. The transport invitation is displayed on a respective provider computing device and selectable by the respective transport provider to accept the respective service request. The system can receive an acceptance of the transport invitation from two or more provider computing devices. Based on the received data from the two or more provider computing devices, the system can select a transport provider from the respective two or more transport providers associated with the two or more provider computing devices to service the respective service request.

18 Claims, 7 Drawing Sheets

(56) References Cited

U.S. PATENT DOCUMENTS

| | | | |
|---|---|---|---|
| 2006/0034201 A1* | 2/2006 | Umeda | H04L 67/12 |
| | | | 370/310 |
| 2006/0136326 A1 | 6/2006 | Heckman | |
| 2009/0147698 A1 | 6/2009 | Potvin | |
| 2009/0216600 A1 | 8/2009 | Hill | |
| 2011/0099040 A1* | 4/2011 | Felt | G06Q 10/02 |
| | | | 715/764 |
| 2011/0313804 A1 | 12/2011 | Camp | |
| 2012/0131170 A1* | 5/2012 | Spat | H04L 67/04 |
| | | | 709/223 |
| 2013/0132140 A1 | 5/2013 | Amin | |
| 2013/0246207 A1* | 9/2013 | Novak | G06Q 30/0641 |
| | | | 705/26.2 |
| 2013/0268406 A1 | 10/2013 | Radhakrishnan | |
| 2015/0058148 A1* | 2/2015 | Grosz | G06Q 30/0269 |
| | | | 705/26.2 |
| 2015/0074215 A1 | 3/2015 | Arquette | |
| 2015/0161564 A1 | 6/2015 | Sweeney | |
| 2015/0339923 A1 | 11/2015 | Konig | |
| 2016/0092962 A1 | 3/2016 | Wasserman | |
| 2016/0275638 A1 | 9/2016 | Korpi | |
| 2016/0279523 A1 | 9/2016 | Altagar | |
| 2016/0307288 A1 | 10/2016 | Yehuda | |
| 2016/0335694 A1 | 11/2016 | Catino | |
| 2017/0046644 A1 | 2/2017 | Zhang | |
| 2017/0109805 A1 | 4/2017 | Eisen | |
| 2017/0132540 A1 | 5/2017 | Haparnas | |
| 2017/0140323 A1 | 5/2017 | Laird | |
| 2017/0161860 A1 | 6/2017 | Schultz | |
| 2017/0193419 A1* | 7/2017 | Haparnas | H04L 67/12 |
| 2017/0220966 A1 | 8/2017 | Wang | |
| 2017/0249847 A1 | 8/2017 | Marueli | |
| 2017/0284820 A1 | 10/2017 | Dryjanski | |
| 2017/0352093 A1 | 12/2017 | Armelin | |
| 2018/0374182 A1* | 12/2018 | Khanna | G06Q 50/30 |
| 2019/0266518 A1 | 8/2019 | Medina | |
| 2019/0318630 A1 | 10/2019 | Marco | |
| 2019/0325374 A1* | 10/2019 | Pan | G06Q 10/06398 |
| 2021/0209542 A1 | 7/2021 | Magazinik | |
| 2022/0335557 A1* | 10/2022 | Adams | G16H 40/20 |

* cited by examiner

MULTI-INVITATION MODE FOR TRANSPORT SERVICES

RELATED APPLICATIONS

This application is a continuation of U.S. patent application Ser. No. 17/568,415, filed on Jan. 4, 2022; which is a continuation of U.S. patent application Ser. No. 16/749,562, filed on Jan. 22, 2020 (now U.S. Pat. No. 11,252,225 issued on Feb. 15, 2022); which is a continuation of U.S. patent application Ser. No. 16/193,652, filed on Nov. 16, 2018 (now U.S. Pat. No. 10,587,679 issued on Mar. 10, 2020), which is a continuation of U.S. patent application Ser. No. 15/368,368, filed on Dec. 2, 2016 (now U.S. Pat. No. 10,171,569 issued on Jan. 1, 2019); the aforementioned applications being hereby incorporated by reference in their respective entireties.

BACKGROUND

A network service may identify a single service provider to provide a service for a requesting user and transmit an invitation message to the respective computing device of the identified service provider. However, in many instances, a service provider may decline invitations to provide services based on any number of factors. In such an instance, if the identified service provider declines the invitation, the network service must identify another available service provider, transmit another invitation message to that service provider, and wait for the service provider to accept or reject the invitation. This process may lead to undesirable delays and uncertainty from the requesting user's perspective.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
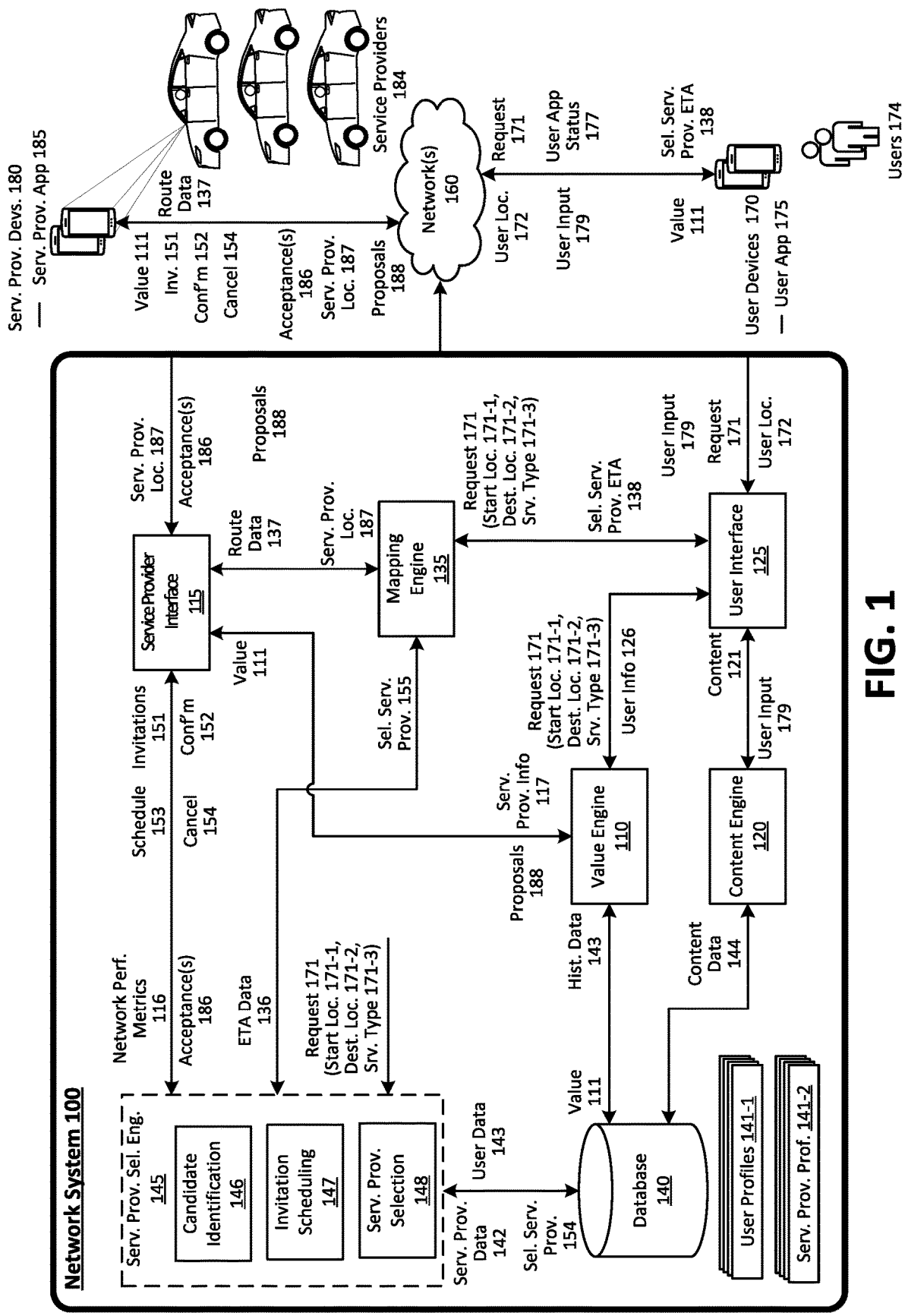
FIG. 1 is a block diagram illustrating an example network system in communication with sets of client devices, according to examples described herein.

A network service, which is implemented by a computing system(s) (referred to herein as a "network system" for purposes of simplicity), is provided herein that links available service providers (e.g., drivers, couriers, autonomous vehicles (AVs), etc.) with requesting users throughout a given geographic region (e.g., a metroplex such as the San Francisco Bay Area). In doing so, the network system also communicates with a pool of service providers over the given geographic region, each operating a vehicle for providing services and one or more computing devices ("service provider devices"). The network system receives requests for services (e.g., a transport service or a delivery service, etc.) from requesting users via a designated user or client application executing on the users' mobile computing devices ("user devices"). In response, the network system can determine a number of candidate service providers from the pool of service providers and transmit invitation messages to the service provider device of one or more of the identified service providers to provide the requested service. A candidate service provider can view information pertaining to the invitation on a service provider device and can choose to accept or reject invitation via a designated service provider application executing on the service provider device. The service provider devices transmit acceptance messages ("acceptances") in response to the invitations to the network system. In response, the network system selects one of the candidate service providers to service the request.

In various aspects, a request can include information regarding a start location (e.g., a pick-up location) for the service where the service provider will meet and pick up the user to begin a trip. The start location can be determined based on real-time location data generated by one or more geo-aware resources (e.g., GPS, GLONASS, etc.) of the user device. Alternatively, the start location can be specified by the user as a user input (e.g., by address or an input on a map displayed on the user device).

According to embodiments, the network system is configured to identify a plurality of candidate service providers in response to receiving a request for service from a user. Candidate service providers can be identified based on the start location and the locations of the candidate service providers. For example, the network system can determine a geo-fence surrounding the start location (or a geo-fence defined by a radius away from the start location) and identify a plurality of service providers within the geo-fence. As an addition or an alternative, the network system can identify candidate service providers based on the service providers' respective estimated times of arrival to the start location. For example, the network system can identify all or a set of service providers with an estimated time of arrival (ETA) at the start location of between five to seven minutes as candidate service providers. The plurality of candidate service providers can also be identified based on the service providers' status (e.g., available, assigned to a user, traveling to the start location, offline, on trip (e.g., is performing the service), etc.).

Furthermore, the network system can identify candidate service providers based on their respective acceptance metrics. An acceptance metric can be a measure of a corresponding service provider's historical data or record of accepting (and/or rejecting) received invitations for service (e.g., 70% rate of acceptance). As an example, the network system can identify candidate service providers using a threshold acceptance metric (e.g., above 75% rate of acceptance). The network system can also identify candidate service providers by examining the acceptance metric in combination with another metric or parameter (e.g., acceptance metric in combination with ETA to the start location).

According to embodiments, the network system is configured to transmit invitation messages to service provider devices of the plurality of candidate service providers. The invitations may be transmitted simultaneously to each of the plurality of candidate service providers. The invitations may also be transmitted according to an invitation transmission schedule determined by the network system. The invitation transmission schedule can be determined to, for example, offset imbalances in the process to select one service provider among interested service providers (e.g., candidate service providers who accepted their respective invitations) to service the request by scheduling some invitations to be transmitted before others. In one aspect, the invitation transmission schedule can be determined based on network performance metrics of the service provider devices (e.g., network latency, network bandwidth, etc.). For instance, the network system can determine an invitation transmission schedule that includes a delay for an invitation to be transmitted to a service provider device having significantly better network performance (e.g., lower network latency) than other service provider devices. In doing so, the network system can reduce advantages that one particular service provider may have in terms of accepting invitations due to having better network performance. In another aspect, the invitation transmission schedule can be determined based on historical record associated with the candidate service providers. For example, the network system can determine a transmission schedule that includes a delay for an invitation to a service provider who has a significantly higher ratio of confirmed acceptance messages to accepted invitations than other candidate service providers. In doing so, the network system can transmit invitations to service providers who have had a high share of their accepted invitations declined in the past before transmitting invitations to other candidate service providers.

The candidate service providers, through their service provider devices, can view the invitations and choose to accept or reject the invitations (e.g., via input or by allowing the time to accept lapse). Acceptance messages are transmitted by the service provider devices to the network system. The network system can select a service provider from the interested service providers (e.g., candidate service providers who accepted their invitations) to service the request. The selection among the interested service providers can be based on the time the acceptance messages are received by the network system. For instance, according to an example, the network system can select the service provider corresponding to the first-received acceptance to service the request. In another example, the network system can select a service provider to service the request in view of one or more of the considerations discussed above (e.g., network parameters, historical data, etc.).

According to embodiments, the network system transmits a confirmation message to the service provider selected to service the request. The service provider device of the selected service provider, through the designated service provider application, can display information included in the confirmation message to inform the service provider that he or she is now confirmed and assigned to service the request for the requesting user. The service provider device can also display a map and route guidance graphics to guide the service provider to the start location from the current location of the service provider. Similarly, the user device, through the designated user application, can display information related to the service and the service provider, including estimated time of arrival of the selected service provider to the start location. In certain implementations, the network system can transmit cancellations or rejections to interested service providers (e.g., candidate service providers who accepted their respective invitations) that are not assigned to service the request to inform those service providers that their acceptance messages were not confirmed. In some examples, the network system can identify additional candidate service providers in the event that no acceptance messages are received within a predefined amount of time after transmitting the invitations. For instance, in response to not receiving any acceptance messages within twenty seconds or one minute after transmitting the invitations to the plurality of candidate service providers, the network system can identify a number of additional candidate service providers.

In certain implementations, the network system can determine corresponding response intervals for one or more of the invitations transmitted to the plurality of candidate service providers. The response intervals can be included in the invitation transmission schedules determined by the network system. An invitation to service a request can expire or be revoked or be invalidated after the end of the response interval. A response interval can begin as soon as the network system transmits the corresponding invitation or can begin when the service provider device receives the invitation. As an example, an invitation to a candidate service provider can have a response interval of thirty seconds; if an acceptance corresponding to the invitation is not received by the network system within thirty seconds of the invitation being transmitted, the invitation can be revoked or invalidated and/or the candidate service provider would no longer be able to accept the invitation. In certain examples, each invitation transmitted to the candidate service providers includes information regarding an associated response interval (if any). In this manner, the service provider devices, through the designated service provider application, can display user interface content to inform the service provider of the time remaining in the response interval (e.g., a dynamically updated countdown timer).

In certain implementations, the network system can determine a response interval based on network performance of the corresponding service provider device, the cellular carrier(s)' network performance, and/or historical data associated with the corresponding service provider. For instance, the network system can determine a short response interval for an invitation transmitted to a device having above-average network performance metrics. As another example, the network system can determine a long response interval for an invitation transmitted to the device of a service provider having a low ratio of confirmed acceptance messages to accepted invitations. In some aspects, the network system can also determine a response interval based on a corresponding service provider's distance from the start location or the service provider's estimated time of arrival to the start location. For example, the network system can determine a shorter response interval for a service provider having a greater estimated time of arrival at the start location compared to other candidate service providers.

In various aspects, the network system can determine a value (e.g., cost) associated with a request. The value can be determined based on a distance and/or an estimated time of travel between the start location and a destination location provided by the user. The value can also be dynamically determined based on an estimated amount of supply and/or an estimated amount of demand in a given region for the service. For instance, the network system can estimate a likelihood or number of requests for service that may be made at any given time or interval based on a number of users in the given geographic region (or in a sub-region within the given geographic region) interacting with user applications. The network system can also estimate the likelihood or number of requests for service that may be made based on historical data collected for a specific day and/or time (e.g., amount of requests or interactions with the user applications during a specific time and/or day, such as New Year's Eve, Fridays at 5 P.M., etc.) or based on nearby events (e.g., a sporting event such as a baseball game). The network system can estimate a number of available service providers in the given geographic region (or that will be in the given geographic region) based on a number of service providers currently available to service requests for service in the given geographic region (or in a sub-region within the given geographic region). In certain implementations, the network system is configured to transmit the value as part of the invitation to the service provider devices. The service providers, by interacting with the service provider application executing on the service provider devices, can view the determined value and other information associated with the request for service (e.g., destination location, estimated time of arrival at the destination location, proposed route(s), traffic information) before choosing to accept or reject the invitation. As an alternative or in addition to, the network system can facilitate a bidding process through which the service providers can enter a desired value for a given invitation.

According to embodiments, a service provider can receive a plurality of invitation messages at any given time, each of the invitation messages corresponding to a respective request for service from a respective user. The service provider, through interactions with the service provider application executing on the service provider device, can view information pertaining to each received invitation message and can select one of the invitations to accept. The service provider application is configured to update a list of received invitation messages such that only unexpired invitations (e.g., invitations with time remaining in their respective response intervals) are displayed. Furthermore, the service provider application can remove, from view, content regarding invitations accepted by other candidate service providers.

Among other benefits, the examples described herein achieve a technical effect of improving user experience (e.g., reduced wait times) in requesting services. Embodiments described herein recognize that existing systems for facilitating the matching of service providers and users suffer from undesirable delays because a service provider selected to provide a requested service can reject or cancel the invitation. By transmitting a plurality of invitation messages and selecting a service provider among the interested service providers to service the request, examples described herein reduces wait times and uncertainty experienced by the requesting user during the process to assign an available service provider. Additionally, by scheduling the transmission of invitation messages according to various criteria, embodiments described herein can equitably select interested service providers to service requests despite, for example, network performance disparities between service provider devices or cellular carrier networks.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Descriptions

FIG. 1 is a block diagram illustrating an example network system in communication with service provider devices and user devices, according to examples described herein. The network system 100 can implement and manage a network service that connects requesting users 174 with service providers 184 that are available to service the users' requests for service 171. The network service can provide a platform that facilitates services to be requested and provided between requesting users 174 and available service providers 184 by way of a user application 175 executing on the user devices 170 and a service provider application 185 executing on the service provider devices 180. As used herein, a user device 170 and a service provider device 180 can correspond to a computing device with functionality to execute a designated application associated with the network service managed by the network system 100. According to embodiments, the user device 170 and the service provider device 180 can correspond to mobile computing devices, such as smartphones, tablet computers, VR or AR headsets, on-board computing systems of vehicles, smart watches, and the like.

The network system 100 can include a user device interface 125 to communicate with user devices 170 over one or more networks 160 via a user application 175. According to examples, a requesting user 174 wishing to utilize the network service can launch the user application 175 and transmit a request for service ("request 171") over network 160 to the network system 100. In certain implementations, the requesting user 174 can view multiple different service types managed by the network system 100, such as ride-pooling, a basic or economy service type, a luxury vehicle service type, a van or large vehicle service type, a professional service provider service (e.g., in which the service providers are certified), a self-driving vehicle service, a rickshaw service, and the like. The network system 100 can utilize the service provider locations 187 to provide the user devices 170 with ETA data of proximate service providers for each respective service. For example, the user application 175 can enable the user 174 to scroll through each service type. In response to a soft selection of a particular service type, the network system 100 can provide ETA data on a user interface of the user application 175 that indicates an ETA for the service type and/or the locations of all proximate available vehicles for that service type. As the user scrolls through each service type, the user interface can update to show visual representations of vehicles for that service type on a map centered around the user 174 or a start location set by the user. The user can interact with the user interface of the user application 175 to select a particular service type, and transmit a request 171.

In certain implementations, the user device interface 125 can receive user input 179 and user application status 177 from the user devices 170 over the network 160. Interactions of users 174 with the user application 175, including with any content displayed therein, can be transmitted as user inputs 179. Such inputs can include selections, text inputs, swipes, gestures, uploads, and the like. User application status 177 can correspond to signals or data indicating a status of the user application 175. For instance, when the user 174 first opens the user application 175, the user application 175 can cause the user device 170 to transmit a synchronization signal as user application status 177 indicating that the user application is open. In addition, the user application status 177 can indicate that the user 174 is viewing or interacting with the home screen of the user application 175. Likewise, the user application status 177 can also indicate that the user 174 is entering a destination location, for example.

In some examples, the request 171 can include a start location within a given region (e.g., a metropolitan area managed by one or more datacenters corresponding to the network system 100) at which a matched service provider is to rendezvous with the requesting user 174. The start location 171-1 can be inputted by the user by entering an address, searching a point of interest, setting a location pin on a user interface of the user application 175. The start location 171-1 can also be determined by a current location of the requesting user 174 (e.g., utilizing location-based resources of the user device 170). The requesting user 174 can further input a destination during or after submitting the request 171 (e.g., destination location 171-2). Additionally, the requesting user 174 can specify a class of service type (e.g., service type 171-3). The start location 171-1, destination location 171-2, and service type 171-3 can be transmitted as part of the request 171.

According to embodiments, the network system 100 includes a service provider selection engine 145 to select and/or select and/or assign a service provider 184 to service a request 171. The service provider selection engine 145 includes candidate identification 146, invitation scheduling 147, and service provider selection 148. In some implementations, the service provider selection engine 145 can determine a mode of operation from a plurality of modes, including a single-invitation mode and a multi-invitation mode. In the single-invitation mode, the network system 100 transmits a single invitation to an identified service provider in response to a request 171. In the multi-invitation mode, the network system 100 can transmit a set of invitations to a plurality of identified service provider in response to a request 171. The network system 100 can select at least one of the candidate service providers who accept their invitations to service the request 171. The determination of the mode of operation of the network system 100 can be based on the service type 171-3 specified by the requesting user 174. For instance, the service provider selection engine 145 can determine to operate in the multi-invitation mode for a particular service type (e.g., a rickshaw service or a taxi service) in which service providers may be likely to reject invitations. The determination of the mode of operation of the network system 100 can also be based on historical data associated with the given geographic region (or a sub-region thereof) managed by the network system 100. For instance, the service provider selection engine 145 can determine, based on historical data from one or more databases 140, that service providers in the given geographic region (or a sub-region thereof) reject received invitations at a rate above a certain threshold value (e.g., 30% of all received invitations are rejected). In response, the service provider selection engine 145 can determine to operate in the multi-invitation mode. In some examples, an operator or administrator of the network system 100 can manually select the mode of operation of the network system 100.

In certain implementations, the service provider selection engine 145 (and/or the candidate identification 146) can determine a plurality of candidate service providers in response to a request 171. This determination can be based on the start location 171-1. For example, the candidate identification 146 can determine a geo-fence surrounding the start location 171-1 (or a geo-fence defined by a radius away from the start location) and identify a plurality of service providers 184 within the geo-fence based on service provider locations 187 received from the service provider devices 180. Likewise, the candidate identification 146 can identify candidate service providers based on the service providers' 184 respective estimated times of arrival at the start location as indicated by, for example, ETA data 136. For example, the candidate identification 146 can identify all service providers 184 with an estimated time of arrival at the start location 171-1 of between five to seven minutes as candidate service providers. The plurality of candidate service providers can also be identified based on the service providers' status (e.g., available, assigned to a user to pick up the user, offline, on trip, etc.). In addition, the candidate identification 146 can identify candidate service providers based on the destination location 171-2 (if entered by the requesting user 174 at the time of transmitting the request 171). For instance, in identifying the candidate service providers, the candidate identification 146 can filter out or ignore certain service providers 184 in the service provider pool who indicate a preference to avoid trips to areas near the destination location 171-2.

Furthermore, the candidate identification 146 can identify candidate service providers based on service provider data 142 pertaining to each of the service providers 184 in the service provider pool. The service provider data 142 can be data stored in a database 140 of the network system 100 and can be historical data collected based on each service provider's interactions and transactions with the network system 100. In some examples, the service provider data 142 can include the service providers' 184 respective acceptance metrics. An acceptance metric can be a measure of a corresponding service provider's record in accepting received invitations (e.g., 70% rate of acceptance). As an example, the candidate identification 146 can identify candidate service providers using a threshold acceptance metric (e.g., above 75% rate of acceptance). In the examples described herein, the candidate identification 146 can identify a plurality of candidate service providers based on their respective acceptance metrics to maintain a level of likelihood that one of the candidate service providers would accept an invitation to service the request 171. For instance, given a pool of service providers with low acceptance metrics, the candidate identification 146 can determine to identify a large number of candidate service providers to maintain the level of probability that one of the candidate service providers accepts the invitations to service the request. Conversely, given a pool of service providers with high acceptance metrics, the candidate identification 146 can determine to identify a small number of candidate service providers. Furthermore, the candidate identification 146 can also identify candidate service providers by examining the acceptance metric in combination with another metric or parameter (e.g., acceptance metric in combination with estimated time of arrival at the start location).

In some examples, the invitation scheduling 147 determines a transmission schedule 153 to transmit invitations 151 to the identified plurality of candidate service providers. Invitations to each of the identified candidate service providers can be transmitted simultaneously or can be transmitted at different times based on the transmission schedule 153 determined by the invitation scheduling 147. The invitation scheduling 147 can determine the schedule 153 based on network performance metrics 116, which can indicate a performance (e.g., latency, bandwidth, throughput, etc.) of service provider devices 180 in communicating with the network system 100 through the network 160. For instance, the invitation scheduling 147 can evaluate the network performance metrics 116 of all candidate service providers to determine a transmission schedule 153 that includes delays for invitations to be transmitted to service provider devices 180 having above-average network performance metrics. In doing so, the invitation scheduling 147 and the network system 100 can determine a transmission schedule 153 that compensates for disadvantages in accepting invitations certain service providers 184 may experience due to poor or below-average network performance associated with their service provider devices 180 in communicating with the network system 100. For instance, a service provider having a service provider device 180 with poor connectivity (e.g., long latency, low bandwidth) has connectivity-based disadvantages in accepting invitations compared with another service provider. The other service provider may be able to accept an invitation associated with the same request 171 before of the service provider with poor network connectivity if invitations are transmitted to both service providers at the same time. By determining a transmission schedule 153 based on network performance metrics 116, the network system 100 can compensate for network connectivity disadvantages experienced by certain service providers 184 and more evenly and fairly select service providers for servicing requests 171. In this manner, service providers 184 who are disadvantaged by network connectivity issues are incentivized to continue to make themselves available for providing services through the network system 100.

In another aspect, the invitation transmission schedule can be determined based on service provider data 142, including, for example, data related to each service provider's historical record in being selected from among other candidate service providers. For example, the invitation scheduling 147 can determine a transmission schedule 153 that includes a delay to transmit an invitation to a service provider 184 who has been selected more often than other service providers by the network system 100 to service requests 171 (e.g., the service provider has a significantly higher ratio of confirmed acceptances to accepted invitations than other candidate service providers.) In doing so, the invitation scheduling 147 can transmit invitations to service providers who have had a high share of their accepted invitations declined in the past before transmitting invitations to other candidate service providers.

In certain implementations, the invitation scheduling 147 can determine the transmission schedule 153 based on user experience factors. For instance, the invitation scheduling 147 can determine that a first candidate service provider offers a desirable user experience compared to other candidate service providers (e.g., shortest ETA to start location, a vehicle type matching user's preferences, previous favorable experiences with the first candidate service provider, etc.) and can determine a transmission schedule 153 such that the first candidate service provider receives his or her invitation before the other candidate service providers. Conversely, the invitation scheduling 147 can determine that a second candidate service provider offers undesirable user experience compared to other candidate service providers (e.g., longest ETA to start location) and can determine a transmission schedule 153 such that the second candidate service provider receives his or her invitation after the other candidate service providers. In this manner, the network system 100 can improve user experience by favoring candidate service providers who are particularly suited to provide desired user experience for a given request 171 in determining the transmission schedule 153.

In some examples, the transmission schedule 153 includes one or more response intervals associated with the invitations 151. The response intervals can also be determined by the invitation scheduling 147 based on the network performance metrics 116, service provider data 142, and user experience factors. As one example, the invitation scheduling 147 can determine a two second response interval for a service provider determined to have above-average network performance metrics 116 and can determine a four second response interval for another service provider determined to have below-average network performance metrics 116. As another example, the invitation scheduling 147 can determine a short (e.g., one second) response interval for a service provider who automatically or programmatically accepts all received invitations (e.g., through a selectable setting within the service provider application 180). The invitation scheduling 147 can make this determination based either one the service provider's historical data (e.g., service provider data 142) in accepting invitations or via communications from the service provider application 180. Furthermore, the transmission scheduling can determine a long (e.g., ten seconds) response interval for service providers determined to offer desirable user experiences (e.g., short ETA to start location, etc.).

According to embodiments, the service provider device interface 115 receives the transmission schedule 153 and transmits the invitation messages 151 in accordance with the transmission schedule 153. In the examples described herein, invitation messages 151 can include information such as the start location 171-1, destination location 171-2, and a value 111 determined for the request 171. The invitation messages 151 are transmitted to the service provider devices 180 of the candidate service providers via the service provider device interface 115 and the network 160. The candidate service providers can view the invitations via the designated service provider application 185 executing on their service provider devices 180. Interacting with the service provider application 185, each candidate service provider can choose to accept or reject his or her respective invitation 151.

Acceptance message(s) 186 are transmitted by the service provider devices 180 to the network system 100. The acceptance message(s) 186 can be relayed by the service provider device interface 115 to the service provider selection engine 145. In certain implementations, the service provider selection 148 within the service provider selection engine 145 can select one service provider among the interested service providers (e.g., candidate service providers who accepted the invitation and transmitted responsive acceptances). In one example, the selection of interested service providers can be based on the time of receipt of the acceptance message(s). For instance, the service provider selection 148 can select a service provider whose acceptance message 186 is received first by the network system 100. In some implementations, the service provider selection 148 can cache or buffer the received acceptance message(s) 186 and select a service provider from among the interested service providers based on one or more criteria including, for example, time of receipt of acceptance message(s) 186, one or more user experience factors, network performance metrics 116, and historical data pertaining to the service providers (e.g., service provider data 142). For example, the service provider selection 148 can receive and buffer a number of acceptance message(s) 186 and select a service provider corresponding to the first received acceptance message to service the request 171. As another example, the service provider selection 148 can select a service provider having desirable user experience factors (e.g., lowest ETA to start location among service providers who transmitted acceptance messages) to service the request 171.

According to embodiments, the service provider selection engine 145 is configured to generate a confirmation message 152 to be transmitted to the selected service provider device by the service provider device interface 115. The confirmation message 152 can inform the selected service provider to begin the service. The service provider selection engine 145 is also configured to generate cancellation messages 154 to be transmitted to interested service providers who were not selected to service the request 171. In some examples, the cancellation message 154 includes information to the service providers to explain why they were not selected to service the request 171 (e.g., a messaging explaining that the service provider accepted too late).

In some aspects, the network system 100 can include a mapping engine 135 to generate ETA data 136 and route data 137. The mapping engine 135 can receive service provider locations 187 and information regarding the request 171, including for example, start location 171-1 and destination location 171-2, to generate ETA data 136 pertaining to estimated times of arrival at the start location 171-1 for service providers 184 in the pool of service providers managed by the network system 100. The ETA data 136 can take into account traffic data in the environment surrounding the start location 171-1. The mapping engine 135 can further generate route data 137 for service providers 184 who are assigned to requests and are assigned to user and traveling to start locations and/or destination locations. The route data 137 can include one or more optimal routes to respective pick-up or destination locations determined by the network system 100. The route data 137 can be transmitted to the service provider devices 180 via the service provider device interface 115 and the network 160. Furthermore, the mapping engine 135 can receive the selected service provider 155 to determine service provider ETA 138. The selected service provider ETA 138 can be transmitted to the user devices 170 through the user device interface 125 and the network 160. Users 174 can view ETA information of service providers selected to service their respective requests 171 via the user application executing on the user devices 170. In addition to or as an alternative, the network system 100 can communicate with a third-party service (e.g., third-party mapping service, or third-party traffic data service) to determine traffic data, the ETA data 136, route data 137, and selected service provider ETA 138.

In various aspects, the selected service provider 155 is transmitted to the mapping engine 135 which can generate service provider ETA 138 (e.g., an estimated time of arrival for the selected service provider). The selected service provider ETA 138 can be transmitted to the user device 170 such that the user 174 can view the selected service provider's ETA to the start location via the user application. The network system 100 can also retrieve service provider profile information 141-2 from the database 140 based on the selected service provider 155. The profile information pertaining to the selected service provider can be transmitted to the user device 170 such that the user 174 can view information pertaining to the selected service provider (e.g., picture, license plate number, service provider rating) within the user application 175. The mapping engine 135 can also transmit route data 137 pertaining to a determined optimal route of the selected service provider to the start location and/or to the destination location based on the selected service provider 155 and the service provider location data 187 received from the selected service provider's computing device 180.

In some examples, the network system 100 includes a value engine 110 to determine a value 111 associated with the request 171. The value engine 110 can determine the value 111 based on a distance and/or an estimated time of travel between the start location 171-1 and the destination location 171-2. The value 111 can be dynamically determined based on a likelihood or a number of requests for service being made (e.g., using service provider information 117 and user information 126). The service provider information 117 can be generated by the service provider device interface 115 (or another component of the network system 100) based, for example, on a number of available service providers in communication with the network system 100 in the given geographic region (or a sub-region thereof). Similarly, the user information 126 can be generated by the user device interface 125 based, for example, on a number of requesting users 174 in communication with the network system 100 (e.g., interacting with the user application 175). In addition, the value engine 110 can determine the value 111 based on historical data 143 received from the database 140. The historical data 143 can correspond to historical value information collected for a specific time or day (e.g., Fridays at 5 P.M., New Year's Eve, etc.) or for certain nearby events (e.g., sporting event such as a baseball game, a concert, and the like). The historical data 143 can also correspond to, for example, a number of users and available service providers in the given geographic region (or a sub-region thereof). In certain implementations, the value engine 110 can facilitate a process by the candidate service providers to determine the value 111 as a part of the service provider selection process. The network system 100 can solicit proposals 188 from the service providers 184 who can enter proposals 188 through the service provider application 185.

According to examples provided herein, the network system 100 can include a content engine 120 that manages the manner in which content is displayed on the user devices 170 and/or the service provider devices 180. Regarding the user devices 170, the content engine 120 can provide content updates based on user inputs 179 on a user interface generated by the user application 175. For example, a user selection on a content feature of the user application 175 can cause the content engine 120 to generate a new screen or user interface on the user application 175, or cause a current screen to pivot between certain displayed features. When inputting a particular start location, the user may utilize a location pin and map content, and set the location pin on a particular location in the map content to input the start location. Additionally, the content engine 120 can cause a start location input box to overlay the map content, which can enable the requesting user 174 to select the input box to cause additional features to be displayed on the user interface (e.g., overlaying the map content). In variations, to return to the map content, the user 174 can input a gesture-such as a scroll or swipe gesture-anywhere on the screen. In response to the gesture, the content engine 120 can cause the additional features to dismiss, and re-enable map content scrolling with the location pin. These dynamically pivoting interfaces can be provided by the content engine 120 for the start location input, the destination location input, or both.

According to embodiments, network system 100 is configured to handle a plurality of requests 171 at the same time in the given geographic region. The network system 100 can identify a set of candidate service providers in response to each request 171. The sets of candidate service providers can also overlap. For instance, a given service provider 184 can be identified as a candidate service provider for two or more requests 171. In such an instance, the service provider device 180 of the given service provider can receive a plurality of invitation messages, each corresponding to a request. The service provider application 185 can display the plurality of invitations and the given service provider can select from among the plurality of invitations to accept one invitation. In some examples, each of the invitations viewed by the given service provider has an associated response interval after which the invitation would expire. The service provider application 180 of the given service provider can display a user interface feature (e.g., a countdown timer) with each of the received invitations such that the service provider can easily see when each of the invitations will expire. As an alternative to or in addition, the service provider application 180 can refresh a list of received invitations periodically and, in that process, remove expired or invalid invitations.

Methodology

Figure 2:
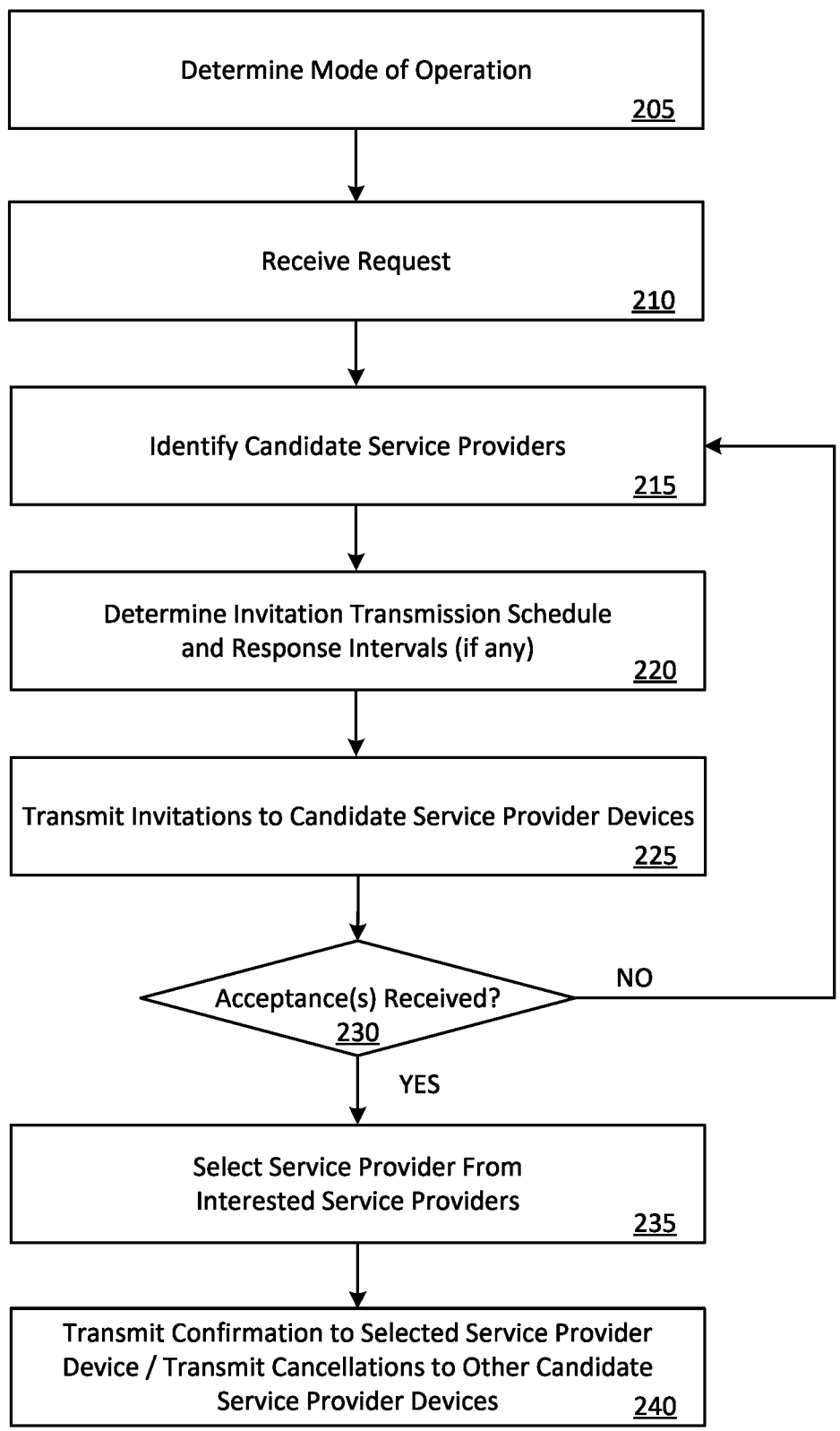
FIG. 2 is a flow chart describing an example method of operating a network system, according to examples described herein.

FIG. 2 is a flow chart describing an example method of operating a network system, according to examples described herein. In the below discussion of FIG. 2, reference may be made to features and examples shown and described with respect to FIG. 1. Furthermore, the process described with respect to FIG. 2 may be performed by an example network system such as the one shown and described with respect to FIG. 1.

Referring to FIG. 2, the network system 100 can determine a mode of operation (205). In certain implementations, the network system 100 can determine between a single-invitation mode of operation in which a single invitation is sent to one identified service provider in response to a request for service and a multi-invitation mode of operation in which a number of candidate service providers can receive invitations in response to a request for service. The determination can be based on historical data (e.g., acceptance metrics) associated with a particular service type, geographic region, time period, and the like. For instance, the network system 100 can determine that for a particular service type some aggregate measure of acceptance metrics of service providers (e.g., an average, a median, a quartile, etc.) is below a certain threshold. In response, the network system 100 can determine to enter the multi-invitation mode of operation for that particular service type. Similarly, the network system 100 can determine to enter into the multi-invitation mode of operation for a given geographic region (or a sub-region thereof) or a given time period (e.g., weekday rush hours) for which acceptance metrics of service providers are below some threshold value. In some examples, system administrators or operators of the network system 100 can determine a mode of operation for a particular service type and/or a particular given region.

The network system 100 can receive requests for service (210) from a user device (e.g., service provider device 180 of FIG. 1). In response, the network system 100 can identify a number of candidate service providers from a pool of service providers managed by the network system 100 (215). As described herein, the candidate service providers can be identified based on one or more parameters including: a distance to the start location, an estimated time of arrival at the start location, an acceptance metric, a service provider status (e.g., available, on-trip, offline etc.), etc.

The network system 100 can determine an invitation transmission schedule (220) that specifies the timeline each invitation is to be transmitted by the network system 100 to a respective service provider device. The transmission schedule may also include response intervals, each dictating how long a corresponding invitation is valid. As described herein, the invitation transmission schedule can be determined based on network performance metrics, historical service provider data (e.g., ratio of confirmed acceptances to accepted invitations over a period of time), user experience factors (e.g., ETA to start location, etc.).

The network system 100 transmits the invitations to the identified candidate service providers based on the determined invitation transmission schedule (225). If no acceptances or responses are received within a period of time (230), the network system 100 can repeat steps 215 to 225 to identify additional candidate service providers to service the request for service. For instance, the network system 100 can increase the radius of a geo-fence used to identify candidate service providers in order to identify additional candidate service providers.

If one or more acceptances are received, the network system 100 can select one service provider among the interested service providers (e.g., a candidate service provider who accepted the invitation and transmitted an acceptance through his or her service provider device) (235). The network system 100 transmits a confirmation to the selected service provider to initiate the service (240). In addition, the network system 100 transmits cancellation messages to the interested service providers who are not selected to fulfill the request for service (240).

User Device

Figure 3:
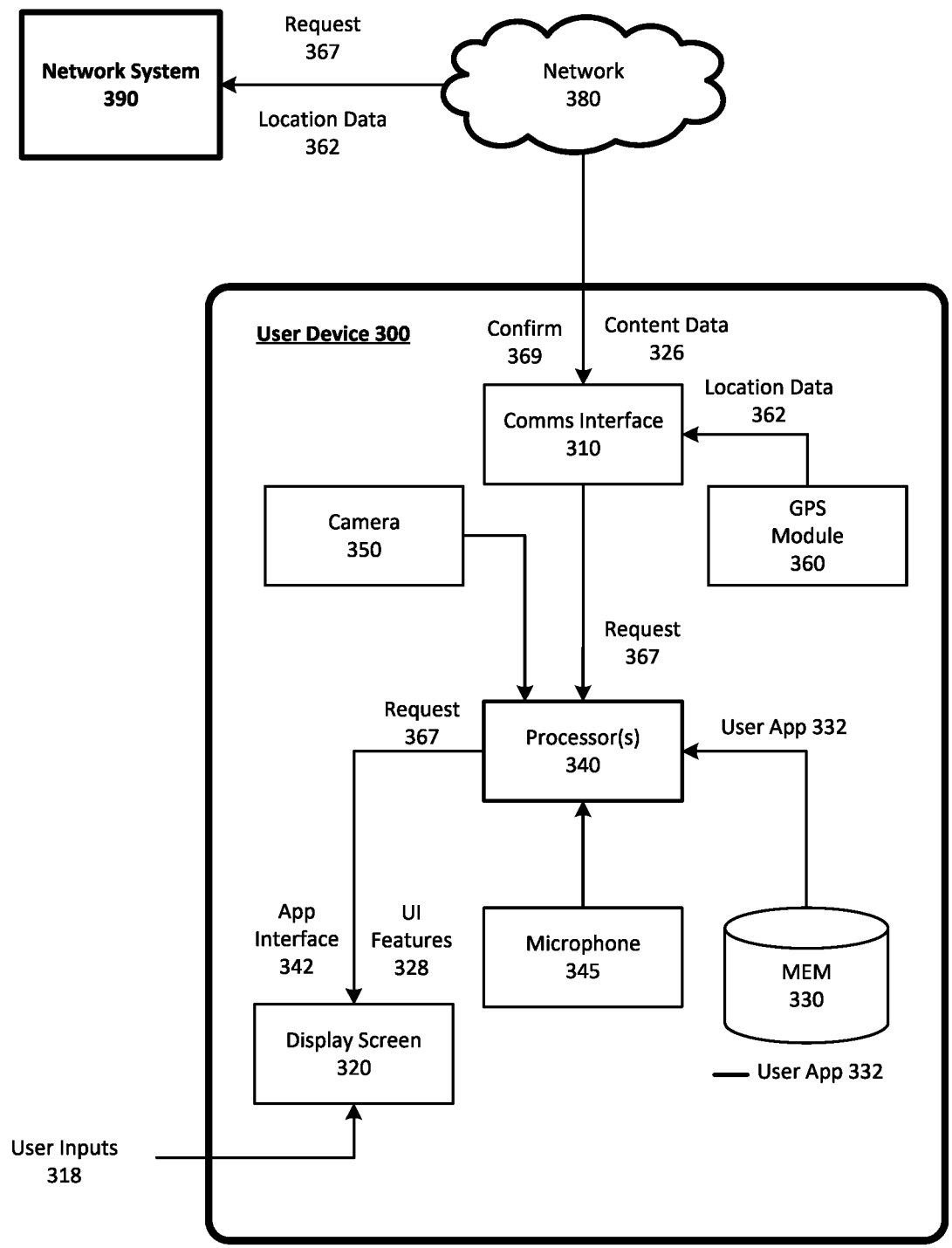
FIG. 3 is a block diagram illustrating an example client device executing a designated client application for communicating with the network service, according to examples described herein.

FIG. 3 is a block diagram illustrating an example user device executing and operating a designated user application for communicating with a network service, according to examples described herein. In many implementations, the user device 300 can comprise a mobile computing device, such as a smartphone, tablet computer, laptop computer, VR or AR headset device, and the like. As such, the user device 300 can include typical telephony features such as a microphone 345, a camera 350, and a communication interface 310 to communicate with external entities using any number of wireless communication protocols. In certain aspects, the user device 300 can store a designated application (e.g., a user app 332) in a local memory 330. In variations, the memory 330 can store additional applications executable by one or more processors 340 of the user device 300, enabling access and interaction with one or more host servers over one or more networks 380.

In response to a user input 318, the user app 332 can be executed by a processor 340, which can cause an app interface 342 to be generated on a display screen 320 of the user device 300. The app interface 342 can enable the user to, for example, check current value levels and availability for the network service. In various implementations, the app interface 342 can further enable the user to select from multiple service types The user can generate a request 367 via user inputs 318 provided on the app interface 342. For example, the user can select a start location, view the various service types and estimated costs, and select a particular service to an inputted destination. In many examples, the user can input the destination prior to pick-up. As provided herein, the user application 332 can further enable a communication link with a network system 390 over the network 380, such as the network system 100 as shown and described with respect to FIG. 1. The processor 340 can generate user interface features 328 (e.g., map, trip progress bar, content cards, etc.) using content data 326 received from the network system 390 over network 380. Furthermore, as discussed herein, the user application 332 can enable the network system 390 to cause the generated user interface 328 to be displayed on the application interface 342.

The processor 340 can transmit the requests 367 via a communications interface 310 to the backend network system 390 over a network 380. In response, the user device 300 can receive a confirmation 369 from the network system 390 indicating the selected service provider and vehicle that will service the request 367 and rendezvous with the user at the start location. In various examples, the user device 300 can further include a GPS module 360, which can provide location data 362 indicating the current location of the requesting user to the network system 390 to, for example, establish the start location and/or select an optimal service provider or autonomous vehicle to service the request 367.

Service Provider Device

Figure 4:
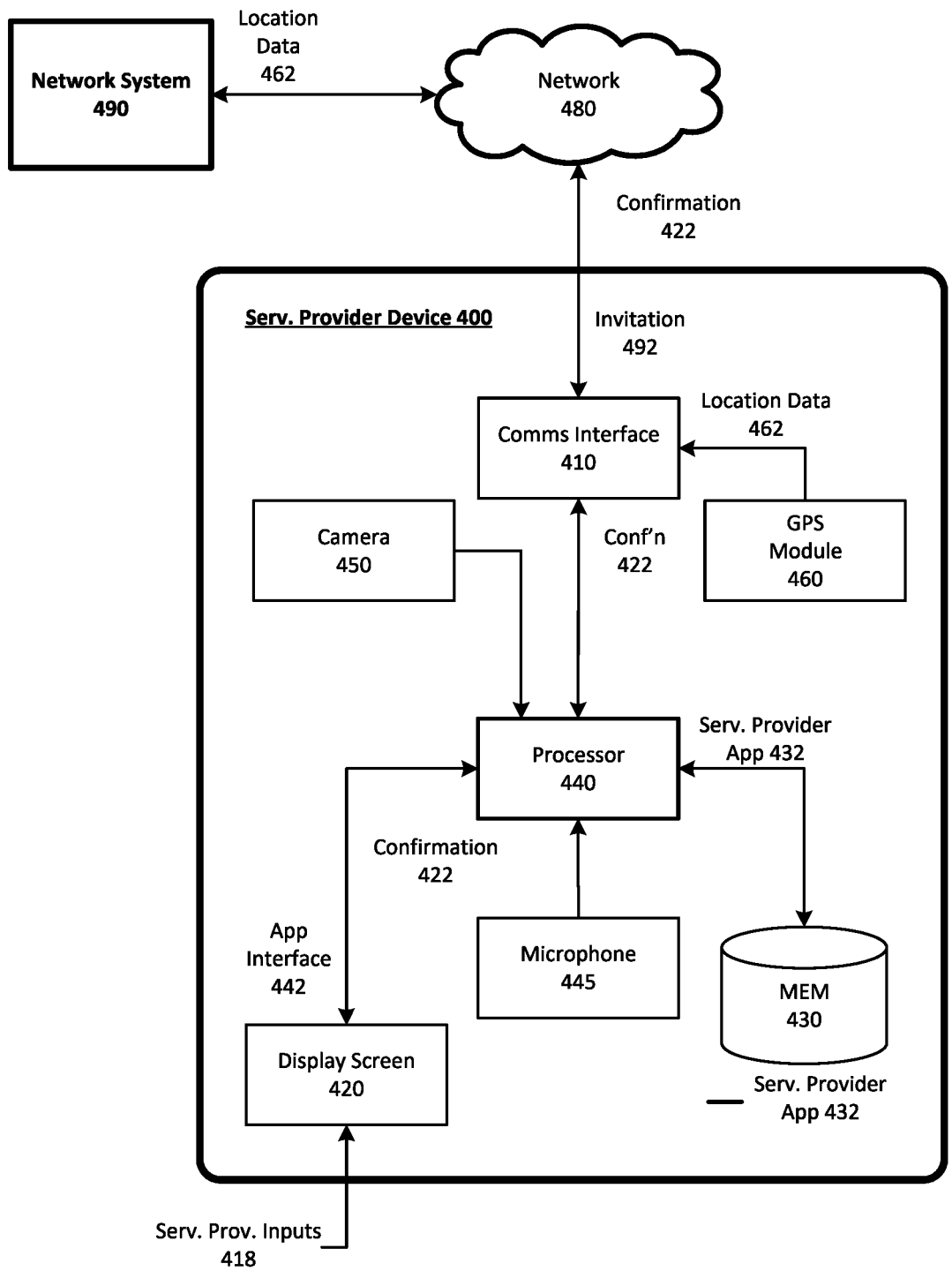
FIG. 4 is a block diagram illustrating an example client device executing a designated service provider application for communicating with the service, according to examples described herein.

FIG. 4 is a block diagram illustrating an example service provider device executing and operating a designated service provider application for communicating with a network service, according to examples described herein. In many implementations, the service provider device 400 can comprise a mobile computing device, such as a smartphone, tablet computer, laptop computer, VR or AR headset device, and the like. As such, the service provider device 400 can include typical telephony features such as a microphone 445, a camera 450, and a communication interface 410 to communicate with external entities using any number of wireless communication protocols. The service provider device 400 can store a designated application (e.g., a service provider app 432) in a local memory 430. In response to a service provider input 418, the service provider app 432 can be executed by a processor 440, which can cause an app interface 442 to be generated on a display screen 420 of the service provider device 400. The app interface 442 can enable the service provider to, for example, accept or reject invitations 492 in order to service requests throughout a given region.

In various examples, the service provider device 400 can include a GPS module 460, which can provide location data 462 indicating the current location of the service provider to the network system 490 over a network 480. Thus, the network system 490 can utilize the current location 462 of the service provider to determine whether the service provider is optimally located to service a particular request. If the service provider is optimal to service the request, the network system 490 can transmit an invitation 492 to the service provider device 400 over the network 480. The invitation 492 can be displayed on the app interface 442, and can be accepted or declined by the service provider. If the service provider accepts the invitation 492, then the service provider can provide a user input 418 on the displayed app interface 442 to provide a confirmation 422 to the network system 490 indicating that the service provider will rendezvous with the requesting user at the start location to service the ride request.

Service Provider Selection Process Timeline

Figure 5:
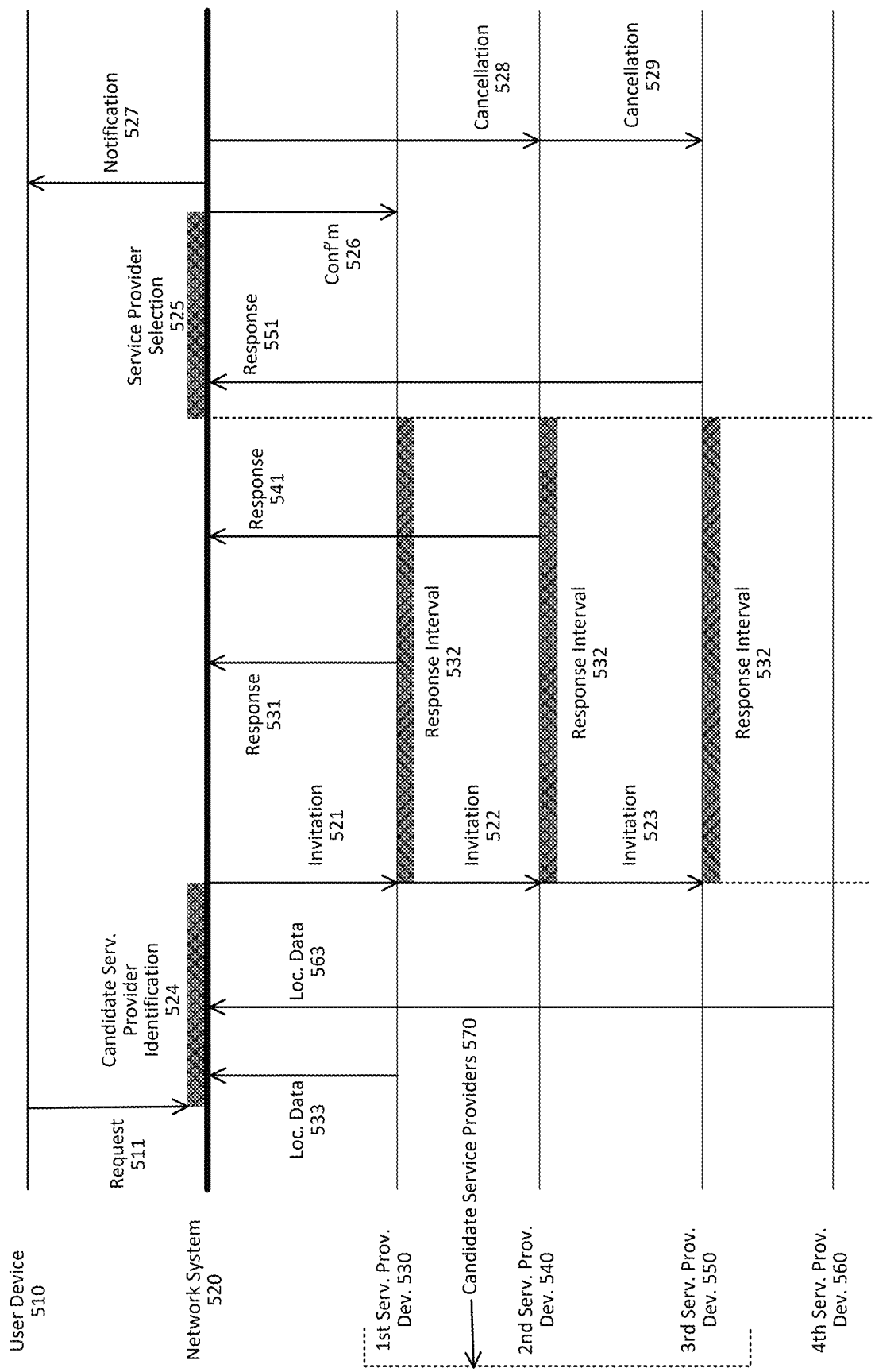
FIG. 5 is a timeline diagram illustrating an example process of selecting a service provider, according to examples described herein.

FIG. 5 is a timeline diagram illustrating an example process of selecting a service provider to service a request, according to examples described herein. In the below discussion of FIG. 5, reference may be made to features and examples shown and described with respect to FIGS. 1 and 2. Furthermore, the service provider selection process described with respect to FIG. 5 may be performed by an example network system such as the one shown and described with respect to FIG. 1.

Referring to FIG. 5, user device 510 can transmit a request 511. In response to receiving the request 511, network system 520 enters a candidate service provider identification period 524. During this period, the network system 520 evaluates parameters (e.g., distance from start location) associated each of the service providers it manages and identifies a plurality of candidate service providers. During this period, the network system 520 can poll first service provider device 530 and fourth service provider device 560 to receive updated location data 533 and 563 in order to determine whether the first and fourth service providers should be identified as candidate service providers. Second service provider device 540 and third service provider device 550 may not need to be polled during this period if the network system 100 has up-to-date location data pertaining to those devices.

In accordance with examples described herein, the network system 100 identifies first service provider device 530, second service provider device 540, and third service provider device 550 as candidate service providers 570. At the end of the candidate service provider identification period 524, the network system 100 transmits invitation 521 to first service provider device 530, invitation 522 to second service provider device 540, and invitation 623 to third service provider device 550. In the process described by FIG. 5, the invitations 521-523 are transmitted simultaneously to each of the candidate service providers 570. In addition, the network system 520 determined the same response interval 532 for each of the invitations 521-523.

During the response interval 532, first service provider device 530 transmits response 531 (e.g., an acceptance message) and second service provider device 540 transmits response 541 (e.g., an acceptance message). Third service device 550 transmits response 551 (e.g., an acceptance message) outside the response interval 532. The network system 520 selects a service provider among interested service providers (first, second, and third service providers) to service the request 511 during the service provider selection period 525. The network system 520 selects first service provider to service the request 511 (e.g., due to response 531 being received by the network system 520 first). The network system 520 transmits a confirmation 526 to first service provider device 530 to inform first service provider that he or she has been selected to service the request 511. The network system 520 also transmits a notification 527 to the user device 510, informing the user that first service provider is assigned to the user and is traveling to the start location. The network system 520 further transmits cancellations 528 and 529 to second service provider device 540 and third service provider device 550, respectively. The cancellations 528 and 529 can include information indicating a reason why the respective service provider was not selected by the network system 520. For instance, cancellation 528 can include information specifying that the response 541 arrived later than the acceptance of another service provider. Cancellation 529 can include information specifying that the response 551 was received outside the response interval 532.

Figure 6:
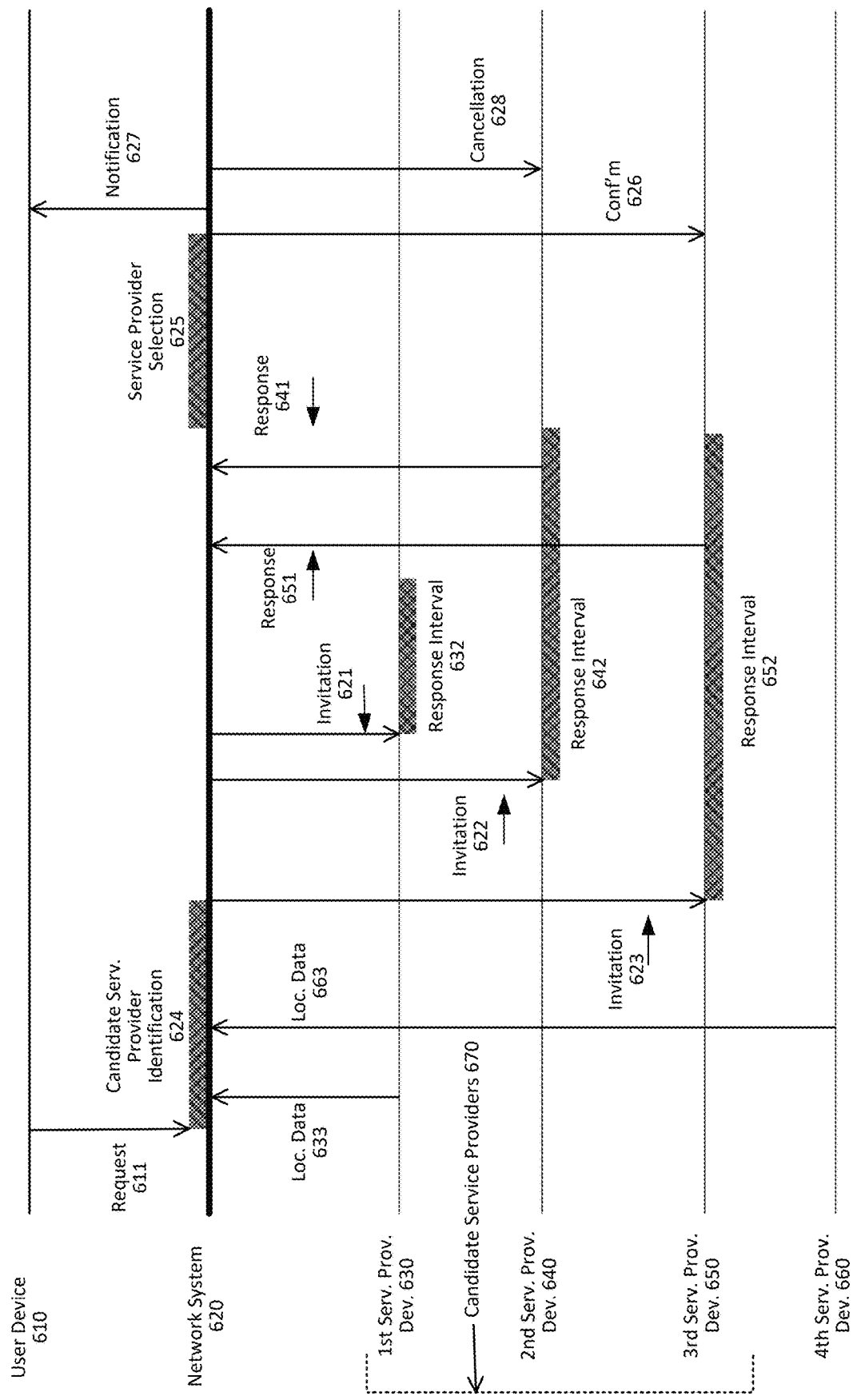
FIG. 6 is another timeline diagram illustrating another example process of selecting a service provider, according to examples described herein.

FIG. 6 is another timeline diagram illustrating another example process of selecting a service provider to service a request, according to examples described herein. In the below discussion of FIG. 6, reference may be made to features and examples shown and described with respect to FIGS. 1 and 2. Furthermore, the service provider selection process described with respect to FIG. 6 may be performed by an example network system such as the one shown and described with respect to FIG. 1.

Referring to FIG. 6, user device 610 can transmit a request 611. In response to receiving the request 611, network system 620 enters a candidate service provider identification period 624. During this period, the network system 620 evaluates parameters (e.g., distance from start location) associated each of the service providers it manages and identifies a plurality of candidate service providers. During this period, the network system 620 can poll first service provider device 630 and fourth service provider device 660 to receive updated location data 633 and 663 in order to determine whether the first and fourth service providers should be identified as candidate service providers. Second service provider device 640 and third service provider device 650 may not need to be polled during this period if the network system 100 has up-to-date location data pertaining to those devices.

In accordance with examples described herein, the network system 100 identifies first service provider device 630, second service provider device 640, and third service provider device 650 as candidate service providers 670. At the end of the candidate service provider identification period 624, the network system 100 transmits invitation 621 to first service provider device 630, invitation 622 to second service provider device 640, and invitation 623 to third service provider device 650. In the process described by FIG. 6, the invitations 621-623 are transmitted in accordance with a transmission schedule in which invitation 623 is first transmitted to third service provider device 650, then invitation 622 is transmitted to second service provider device 640, and lastly, invitation 621 is transmitted to first service provider device 630. Furthermore, according to the transmission schedule determined by the network system 620, response interval 632 corresponding to invitation 621 is short in comparison to response intervals 642 and 652.

First service provider device 630 does not transmit a response to the network system 620. Second service provider device 640 transmits response 641 (e.g., an acceptance message) during the response interval 642 to the network system 620. Third service provider device 650 transmits response 651 (e.g., an acceptance message) during response interval 652. The network system 620 selects a service provider among interested service providers (the second and third service providers) to service the request 611 during the service provider selection period 625. The network system 620 selects third service provider to service the request 611 (e.g., due to response 651 being received by the network system 620 first). The network system 620 transmits confirmation 626 to third service provider device 630 to inform third service provider that she or he has been selected to service the request 611. The network system 620 also transmits a notification 627 to the user device 610, informing the user that third service provider is assigned to the user and is traveling to the start location. The network system 620 further transmits cancellation 628 to second service provider device 640. The cancellation 628 can include information indicating a reason why the respective service provider was not selected by the network system 620 (e.g., information specifying that the response 641 arrived later than the acceptance of another driver).

Hardware Diagram

Figure 7:
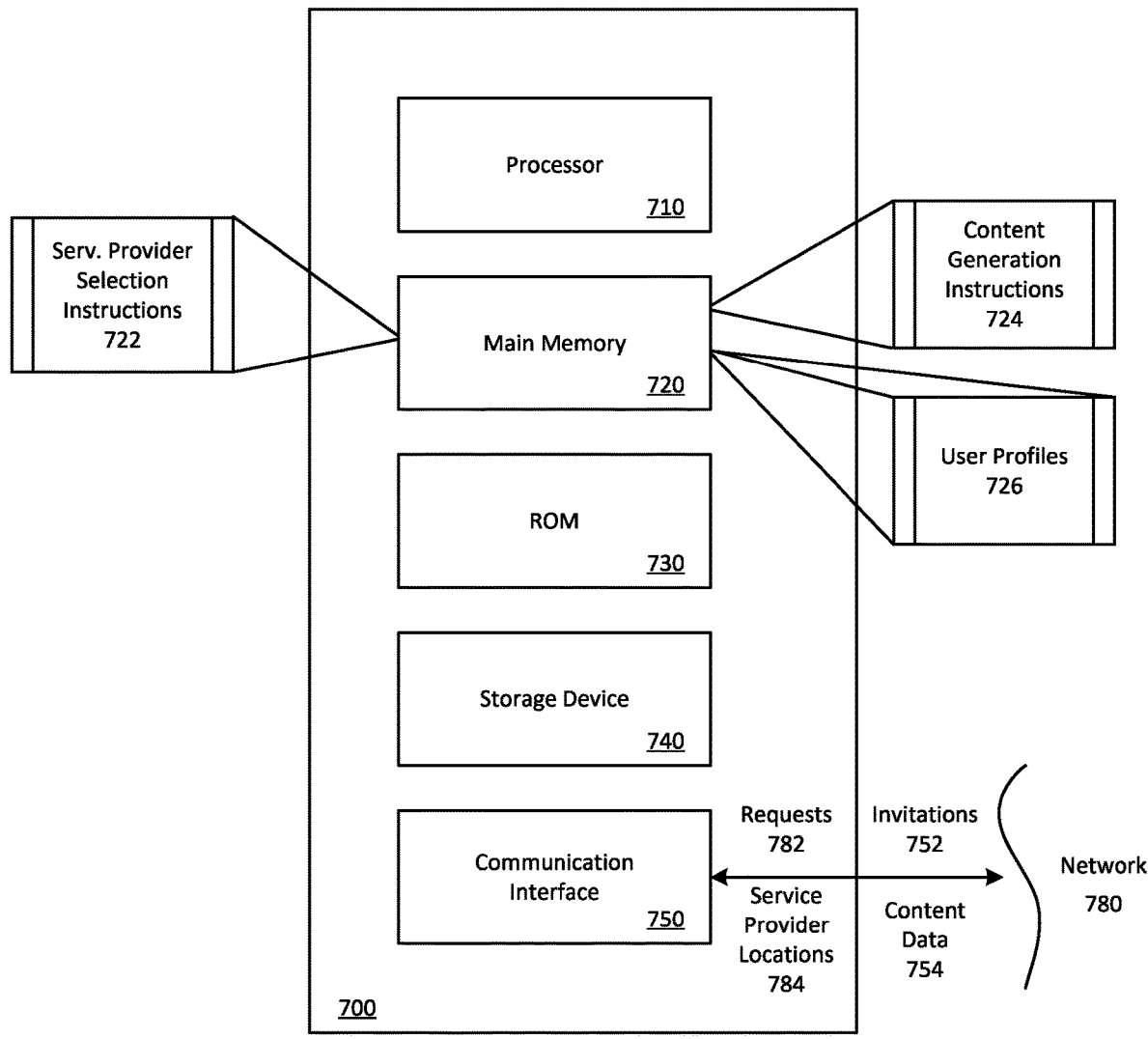
FIG. 7 is a block diagram illustrating a computer system upon which examples described herein may be implemented.

FIG. 7 is a block diagram that illustrates a computer system upon which examples described herein may be implemented. A computer system 700 can be implemented on, for example, a server or combination of servers. For example, the computer system 700 may be implemented as part of a network service, such as described in FIGS. 1 through 6. In the context of FIG. 1, the network system 700 may be implemented using a computer system 700 such as described by FIG. 7. The network system 100 may also be implemented using a combination of multiple computer systems as described in connection with FIG. 7.

In one implementation, the computer system 700 includes processing resources 710, a main memory 720, a read-only memory (ROM) 730, a storage device 740, and a communication interface 750. The computer system 700 includes at least one processor 710 for processing information stored in the main memory 720, such as provided by a random access memory (RAM) or other dynamic storage device, for storing information and instructions which are executable by the processor 710. The main memory 720 also may be used for storing temporary variables or other intermediate information during execution of instructions to be executed by the processor 710. The computer system 700 may also include the ROM 730 or other static storage device for storing static information and instructions for the processor 710. A storage device 740, such as a magnetic disk or optical disk, is provided for storing information and instructions.

The communication interface 750 enables the computer system 700 to communicate with one or more networks 780 (e.g., cellular network) through use of the network link (wireless or wired). Using the network link, the computer system 700 can communicate with one or more computing devices, one or more servers, and/or one or more self-driving vehicles. In accordance with examples, the computer system 700 receives requests 782 from mobile computing devices of individual users. The executable instructions stored in the memory 730 can include service provider selection instructions 722, which the processor 710 executes to select a service provider to service the request 782. In doing so, the computer system can receive service provider locations 784 of service providers operating throughout the given region, and the processor can execute the service provider selection instructions 722 to identify a plurality of candidate service providers and transmit invitation messages 752 to each of the candidate service providers to enable the service providers to accept or decline the invitations. The processor can further execute the service provider selection instructions 722 to select a service provider among interested candidate service providers to service the request 782.

The executable instructions stored in the memory 720 can also include content generation instructions 724, which enable the computer system 700 to access user profiles 726 and other user information in order to select and/or generate user content 754 for display on the user devices. As described throughout, user content 754 can be generated based on information pertaining to the state of the request (e.g., ETA/destination info). By way of example, the instructions and data stored in the memory 720 can be executed by the processor 710 to implement an example network system 100 of FIG. 1. In performing the operations, the processor 710 can receive requests 782 and service provider locations 784, and submit invitation messages 752 to facilitate the servicing of the requests 782. The processor 710 is configured with software and/or other logic to perform one or more processes, steps and other functions described with implementations, such as described by FIGS. 1 and 2, and elsewhere in the present application.

Examples described herein are related to the use of the computer system 700 for implementing the techniques described herein. According to one example, those techniques are performed by the computer system 700 in response to the processor 710 executing one or more sequences of one or more instructions contained in the main memory 720. Such instructions may be read into the main memory 720 from another machine-readable medium, such as the storage device 740. Execution of the sequences of instructions contained in the main memory 720 causes the processor 710 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A computing system for managing a network-based service, the computing system comprising:
   one or more processors; and
   one or more memory resources storing instructions that, when executed by the one or more processors, cause the computing system to:
   receive, over one or more networks, service requests from computing devices of requesting users, each respective service request including a start location in a geographic region and a destination location;
   for a respective service request received from a sub-region of the geographic region:
   determine a plurality of transport providers available to service the respective service request;
   make a determination whether to process the respective service request in accordance with a multi-invitation mode based on historical data associated with the geographic region, the historical data corresponding to an acceptance metric for service providers within the sub-region;
   in response to determining to process the respective service request in accordance with the multi-invitation mode, transmit, over the one or more networks, data corresponding to a transport invitation to each of a plurality of provider computing devices operated by the plurality of transport providers, wherein the transport invitation is displayed on a respective provider computing device and selectable by the respective transport provider to accept the respective service request;
   receive, over the one or more networks, data corresponding to an acceptance of the transport invitation from each of two or more provider computing devices of the plurality of provider computing devices; and
   based on the received data from the two or more provider computing devices, select a transport provider from the respective two or more transport providers associated with the two or more provider computing devices to service the respective service request.

2. The computing system of claim 1, wherein the executed instructions further cause the computing system to:
   receive, over the one or more networks, location data from the plurality of provider computing devices, the location data indicating current locations of the plurality of transport providers;
   wherein the executed instructions cause the computing system to select the selected transport provider based at least in part on the current location of the selected transport provider and the start location of the respective service request.

3. The computing system of claim 1, wherein the transport invitation indicates the destination location of the respective service request.

4. The computing system of claim 1, wherein the executed instructions further cause the computing system to:
- determine a value for the respective service request based on at least one of a distance or an estimated time of travel between the start location and the destination location of the respective service request;
- wherein the data corresponding to the transport invitation transmitted to each of the plurality of provider computing devices includes the value of the respective service request.

5. The computing system of claim 1, wherein the executed instructions further cause the computing system to:
- based on selecting the selected transport provider to service the respective service request, transmit, over the one or more networks, a confirmation to the provider computing device of the selected transport provider.

6. The computing system of claim 1, wherein the executed instructions further cause the computing system to:
- transmit, over the one or more networks, a notification to the computing device of a requesting user associated with the respective service request, the notification including identifying information of the selected transport provider.

7. The computing system of claim 1, wherein selecting the selected transport provider to service the respective service request comprises:
- determining estimated times of arrival of transport providers associated with the two or more provider computing devices to the start location indicated in the respective service request;
- wherein the selected transport provider is selected based on the estimated time of arrival of the selected transport provider in comparison with the estimated times of arrival of other transport providers associated with the two or more provider computing devices to the start location.

8. A non-transitory computer readable medium storing instructions that, when executed by one or more processors of a computing system, cause the computing system to:
- receive, over one or more networks, service requests from computing devices of requesting users, each respective service request including a start location in a geographic region and a destination location;
- for a respective service request received from a sub-region of the geographic region:
  - determine a plurality of transport providers available to service the respective service request;
  - make a determination whether to process the respective service request in accordance with a multi-invitation mode based on historical data associated with the geographic region, the historical data corresponding to an acceptance metric for service providers within the sub-region;
  - in response to determining to process the respective service request in accordance with the multi-invitation mode, transmit, over the one or more networks, data corresponding to a transport invitation to each of a plurality of provider computing devices operated by the plurality of transport providers, wherein the transport invitation is displayed on a respective provider computing device and selectable by the respective transport provider to accept the respective service request;
  - receive, over the one or more networks, data corresponding to an acceptance of the transport invitation from each of two or more provider computing devices of the plurality of provider computing devices; and
  - based on the received data from the two or more provider computing devices, select a transport provider from the respective two or more transport providers associated with the two or more provider computing devices to service the respective service request.

9. The non-transitory computer readable medium of claim 8, wherein the executed instructions further cause the computing system to:
- receive, over the one or more networks, location data from the plurality of provider computing devices, the location data indicating current locations of the plurality of transport providers;
- wherein the executed instructions cause the computing system to select the selected transport provider based at least in part on the current location of the selected transport provider and the start location of the respective service request.

10. The non-transitory computer readable medium of claim 8, wherein the transport invitation indicates the destination location of the respective service request.

11. The non-transitory computer readable medium of claim 8, wherein the executed instructions further cause the computing system to:
- determine a value for the respective service request based on at least one of a distance or an estimated time of travel between the start location and the destination location of the respective service request;
- wherein the data corresponding to the transport invitation transmitted to each of the plurality of provider computing devices includes the value of the respective service request.

12. The non-transitory computer readable medium of claim 8, wherein the executed instructions further cause the computing system to:
- based on selecting the selected transport provider to service the respective service request, transmit, over the one or more networks, a confirmation to the provider computing device of the selected transport provider.

13. The non-transitory computer readable medium of claim 8, wherein the executed instructions further cause the computing system to:
- transmit, over the one or more networks, a notification to the computing device of a requesting user associated with the respective service request, the notification including identifying information of the selected transport provider.

14. The non-transitory computer readable medium of claim 8, wherein selecting the selected transport provider to fulfill the respective service request comprises:
- determining estimated times of arrival of transport providers associated with the two or more provider computing devices to the start location indicated in the respective service request;
- wherein the selected transport provider is selected based on the estimated time of arrival of the selected transport provider in comparison with the estimated times of arrival of other transport providers associated with the two or more provider computing devices to the start location.

15. A computer-implemented method of managing a network-based service, the method being performed by one or more processors and comprising:

receiving, over one or more networks, service requests from computing devices of requesting users, each respective service request including a start location in a geographic region and a destination location;

for a respective service request received from a sub-region of the geographic region:

determining a plurality of transport providers available to service the respective service request;

making a determination whether to process the respective service request in accordance with a multi-invitation mode based on historical data associated with the geographic region, the historical data corresponding to an acceptance metric for service providers within the sub-region;

in response to determining to process the respective service request in accordance with the multi-invitation mode, transmitting, over the one or more networks, data corresponding to a transport invitation to each of a plurality of provider computing devices operated by the plurality of transport providers, wherein the transport invitation is displayed on a respective provider computing device and selectable by the respective transport provider to accept the respective service request;

receiving, over the one or more networks, data corresponding to an acceptance of the transport invitation from each of two or more provider computing devices of the plurality of provider computing devices; and based on the received data from the two or more provider computing devices, selecting a transport provider from the respective two or more transport providers associated with the two or more provider computing devices to service the respective service request.

16. The method of claim 15, further comprising:

receiving, over the one or more networks, location data from the plurality of provider computing devices, the location data indicating current locations of the plurality of transport providers;

wherein the one or more processors select the selected transport provider based at least in part on the current location of the selected transport provider and the start location of the respective service request.

17. The method of claim 15, wherein the transport invitation indicates the destination location of the respective service request.

18. The method of claim 15, further comprising:

determining a value for the respective service request based on at least one of a distance or an estimated time of travel between the start location and the destination location of the respective service request;

wherein the data corresponding to the transport invitation transmitted to each of the plurality of provider computing devices includes the value of the respective service request.

* * * * *